United States Patent
Tsai et al.

(10) Patent No.: US 6,621,987 B1
(45) Date of Patent: Sep. 16, 2003

(54) METHOD OF FAST CONVERGING APPROPRIATE EXPOSURE VALUE

(75) Inventors: Chih-hua Tsai, Hsinchu (TW); Wan-chi Lue, Yunlin (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 10/248,555

(22) Filed: Jan. 29, 2003

(51) Int. Cl.$^7$ .................. G03B 7/08; H04N 5/235
(52) U.S. Cl. .............. 396/234; 396/236; 348/229.1; 348/364
(58) Field of Search ................ 396/233, 234, 396/236; 348/362–366, 229.1, 296

(56) References Cited

U.S. PATENT DOCUMENTS

| | | | | |
|---|---|---|---|---|
| 5,745,808 A | * | 4/1998 | Tintera | 396/236 |
| 5,831,676 A | * | 11/1998 | Takahashi et al. | 348/362 |
| 5,862,240 A | * | 1/1999 | Akimoto et al. | 396/236 |
| 6,366,680 B1 | * | 4/2002 | Brunk et al. | 348/229.1 X |

* cited by examiner

*Primary Examiner*—W. B. Perkey
(74) *Attorney, Agent, or Firm*—Jiang Chyun IP Office

(57) ABSTRACT

A method of fast converging an appropriate exposure value. By establishing a EV lookup table of exposure valuescamera characteristics that can be easily modified, the image extracted by an optical sensor of a digital camera is fast converged into an appropriate exposure value quickly in a close-loop computation. Therefore, the multi-variable (exposure time, gain value and f-number number) exposure control can be easily achieved to fast converge the appropriate automatic exposure value.

11 Claims, 3 Drawing Sheets

METHOD OF FAST CONVERGING APPROPRIATE EXPOSURE VALUE

CROSS REFERENCE TO RELATED APPLICATIONS

This application claims the priority benefit of Taiwanese application serial no. 91133815, filed on Nov. 20, 2002.

BACKGROUND OF INVENTION

1. Field of the Invention

The invention relates in general to method of converging an exposure value (EV), and more particularly, to a method of establishing a lookup table of exposure values to fast converge an appropriate exposure value.

2. Related Art of the Invention

In a digital photographic device with 1024×768 pixels and a brightness range of 0 to 255 for each pixel, how to fast converge the average brightness of an image has become the most exigent problem to be resolved.

In Taiwanese Patent No. 234748 "Fuzzy controlled automatic exposure system of digital electrostatic camera," a fuzzy control method has been used to maintain appropriate brightness of a captured image. However, the fuzzy control method is so complex that an experienced professional operator is often required to regulate the control mechanism, so as to maintain the appropriate brightness of the image. Therefore, the automatic convergence process of exposure value is too slow, and consumption of computation resources is significant.

SUMMARY OF INVENTION

The present invention provides a method of fast converging an appropriate exposure value. In the present invention, a lookup table of exposure values that is easily modified is established. An image captured by an optical sensor of a digital photographic device can thus be fast converged into an appropriate exposure value in a close-loop computation. Therefore, the present invention not only easily achieves multi-variable exposure control, including the control of exposure time, gain value and f-number, but also fast converges an appropriate automatic exposure value.

The fast converging method provided by the present invention is suitable for use in a digital photographic device and comprises the following steps. A lookup table of exposure values is established. In the lookup table, the exposure value is a function of exposure time, gain value and F-number. An automatic exposure convergence window is defined, and a center of the automatic exposure convergence window is defined as a target brightness. A previous exposure value is selected as an initial setup value. An image is captured by an optical sensor of the digital photographic device and segmented into a plurality of sub-regions. The average brightness of each sub-region is multiplied by a corresponding image weight and divided by an overall image weight, such that an average brightness of the image is obtained. A predicted exposure value is obtained according to the previous exposure value and a truncate function, which is a function of the target brightness and the average brightness. When the predicted exposure value is the same as the previous exposure value, the automatic value is convergent and the automatic exposure is achieved. Meanwhile, the predicted exposure value is the appropriate exposure value. If the predicted exposure value is not equivalent to the previous exposure value, the predicted exposure value is used as the previous exposure value. The exposure time, gain value and f-number of the previous exposure value can be obtained from the lookup table of exposure values, and the steps of capturing the image, segmenting the image, obtaining the predicted exposure value and automatic exposure are repeated until the predicted exposure value is automatically converged.

In one embodiment of the present invention, the table of exposure values can be adjusted.

In one embodiment of the present invention, the minimum interval of exposure values in the lookup table is referred to for the resolution of exposure value, which can be adjusted.

The dimension of the automatic exposure convergence window is proportional to the resolution of exposure value.

In the present invention, the dimension of the automatic exposure convergence window is equivalent to the resolution of exposure value. The automatic exposure convergence window is located between the target brightness times two to the power of negative resolution of exposure value divided by two and the target brightness times two to the power of resolution of exposure value divided by two.

In one embodiment, the predicted exposure value is derived by subtracting the truncate function from the previous exposure value.

In one embodiment of the present invention, the optical sensor includes a charge coupled device (CCD) or a complementary metal oxide semiconductor (CMOS) device.

According to the above, the present invention establishes an easily modified table of exposure value, allowing an appropriate exposure value of an image captured by an optical sensor of a digital photographic device to be fast converged by a close-loop computation. Therefore, the prevent invention achieves the multi-variable (exposure time, gain value and fF-number) exposure control, and fast converges the appropriate automatic exposure value.

BRIEF DESCRIPTION OF DRAWINGS

These, as well as other features of the present invention, will become more apparent upon reference to the drawings wherein.

DETAILED DESCRIPTION

Figure 1:
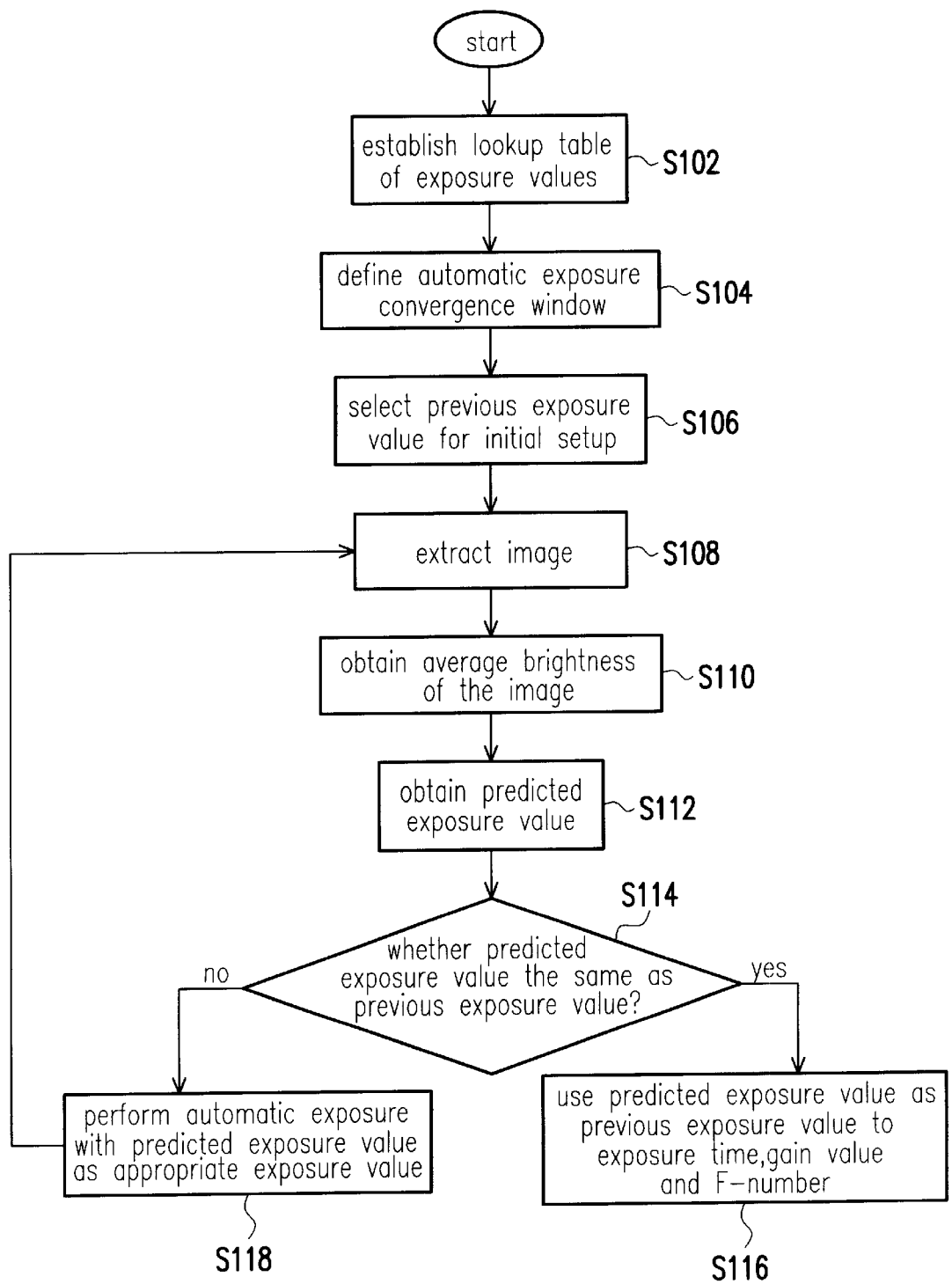
FIG. 1 shows a process flow of a method of fast converging an appropriate exposure value.

FIG. 1 shows the process flow of the method of fast converging an appropriate exposure value in one embodiment of the present invention. As shown in FIG. 1, in the fast converging method, a lookup table of exposure values (EV) is established in step S102 according to the specification of the digital photographic device such as digital camera or digital camcorder. In the lookup table of exposure values, the exposure value is a function of exposure time (Exp_t), gain value (AGC) and f-number (F_no). The exposure value can be expressed as:

$$EV = 2\log_2(F\_no) - \log_2(Exp\_t) - \log_2(AGC/100) \quad (1)$$

Figure 2:
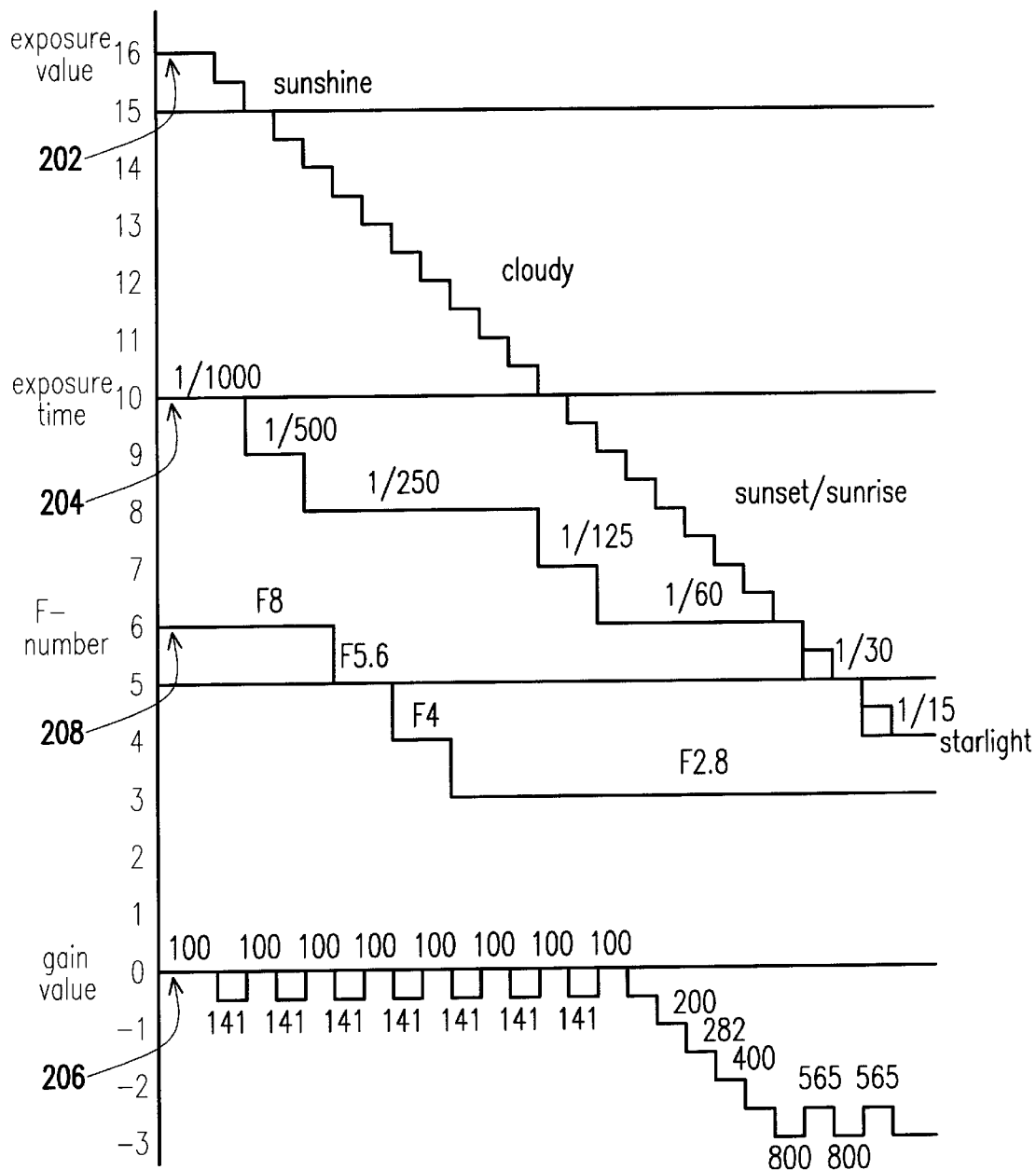
FIG. 2 shows an example of a lookup table of exposure values.

FIG. 2 shows an example of a lookup table of exposure values derived according to the relationship expressed by Equation (1). In this embodiment, the exposure values ranged from about 4 to about 16 are segmented into four exposure regions, including a sunshine region, a cloudy region, a sunset/sunrise region, and a starlight region. The exposure time (204) is about 1/1000 sec to about 1/15 sec, the gain value (206) is from about 100 to about 800, and the fF-number (208) is from F2.8 to F8. To assure the mapping relationship between the exposure value and the exposure time, the gain value and f-number matches Equation (1), a particular cell in the lookup table is examined in this embodiment. For example, when the exposure value is 15, in FIG. 2, the exposure time, the gain value and the fF-number mapping the exposure value of 15 is 1/500, 100 and F8. Substituting these values into Equation (1), an exposure value EV can be obtained as:

$$EV = 2\log_2 8 - \log_2(1/500) - \log_2(100/100) \cong 6 + 9 = 15$$

In this embodiment, the minimum difference between the exposure values is 0.5, such that the resolution of the exposure value is 0.5 for this lookup table. However, the resolution of the exposure value can be adjusted according to specific requirement of the user and the specification of the digital photographic device.

In step S104, an automatic exposure converging window is defined, and a center of the automatic exposure point is defined as a target brightness (Target Y). The target brightness can be set up by the user. In one embodiment of the present invention, the dimension of the automatic exposure convergence window is set up equivalent to the resolution of the exposure values. The automatic exposure convergence window ranges between the target brightness times two to the power of negative resolution of exposure divided by two and the target brightness times two to the power of resolution of exposure divided by two. That is, the range of the automatic exposure convergence window can be expressed as Window((Target Y×2 (−EV Resolution/2)),(Target Y×2 (−EV Resolution/2))). For example, when Target Y is 100, and EV resolution is 0.5, the brightness that falls within the range of 84.09 and 118.92 is automatic exposure convergent.

In step S106, a previous exposure value is selected from the exposure values in the lookup table.

Figure 3:
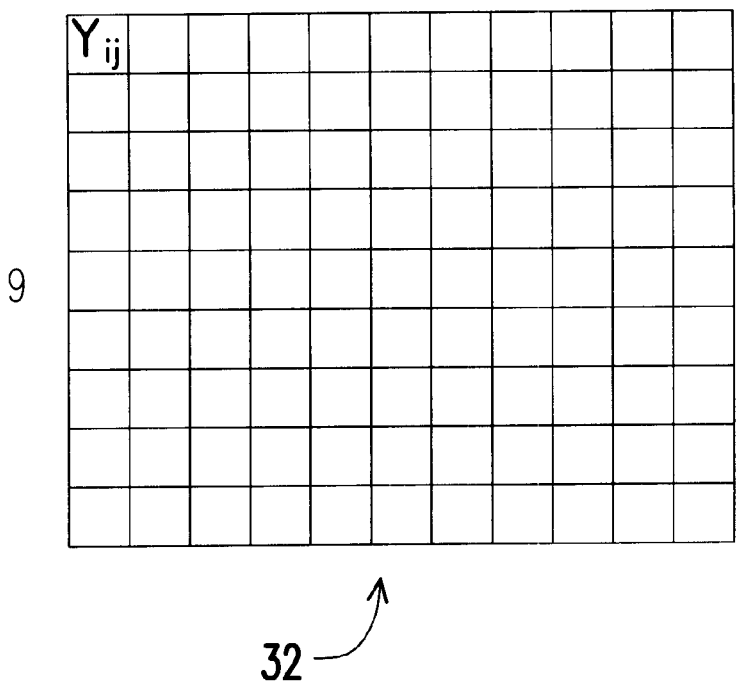
FIG. 3 shows a captured image and an image weighting value thereof.
Figure 3:
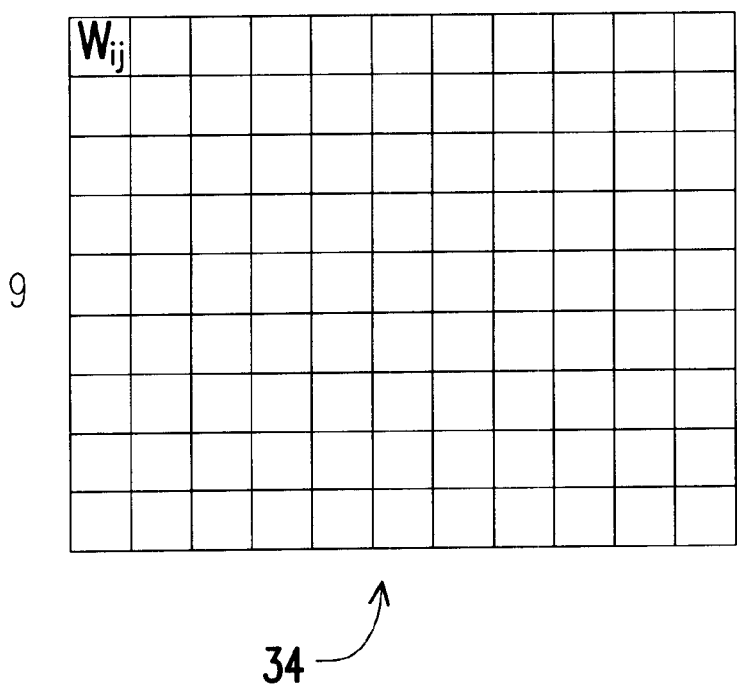

In step S108, an image is extracted by an optical sensor, such as a charge coupled device (CCD) or a complementary metal-oxide semiconductor (CMOS) device, of the digital photo-graphic device. The image is then segmented into a plurality of sub-regions. In step S110, an average brightness of each sub-region is multiplied by a corresponding image weight (W) and divided by an overall image weight, such that the average brightness for each pixel of the image Yavg is obtained. For a clearer description, referring to FIG. 3, the extracted image and the image weight are illustrated. As shown in FIG. 3, the extracted image 32 is segmented into 9×11 sub-regions, while the average brightness of each sub-region 32 is Y. The image weight 34 is also segmented into 9×11 sub-regions, and the regional image weight is W. The average brightness Yavg for each pixel of the captured image can thus be obtained by the following equation.

$$Yavg = \frac{\sum_{j=0}^{10} \sum_{i=0}^{8} Y_{ij} W_{ij}}{\sum_{j=1}^{10} \sum_{i=0}^{8} W_{ij}} \quad (2)$$

A predicted exposure value is further derived according to the previous exposure value and a truncate function in step S112. The truncation function is a function of the target brightness (Target Y) and the average brightness (Yavg). In this embodiment, the predicted exposure value is equal to the previous exposure value subtracted by the truncate function. That is, the relationship between the predicted exposure value, the previous exposure value and the truncate function can be expressed as:

$$\text{Predicted EV} = \text{Previous EV Truncate}(\log_2(\text{Target Y}/Yavg)) \quad (3)$$

For example, when the exposure resolution of the lookup table is 0.5, truncate function Truncate(4.4) is 4.5, and truncate function Truncate(4.1) is 4. Therefore, the truncate function is determined according to the exposure resolution.

Whether the predicted exposure value is the same as the previous exposure value is determined in step S114. If the predicted exposure value is the same as the previous exposure value, the automatic exposure is convergent and the automatic exposure is complete with the predicted exposure value as the appropriate exposure value in step S116. For example, when the target brightness is 100, and the previous exposure selected from the lookup table of exposure values is 12, the average brightness of the extracted image is 105, as the predicted exposure value is 12 subtracted by the truncate function, which is Truncate($\log_2 (100/105)$)=0, the predicted exposure value is the same as the previous value. Therefore, the predicted exposure value 12 is the appropriate exposure value for automatic exposure.

If the predicted exposure value is not the same as the previous exposure value, the predicted exposure value is used as the previous exposure, and the corresponding exposure time, gain value and fF-number thereof are obtained from the lookup table. The steps S108 to S114 are then repeated until the automatic convergence is achieved. For example, when the exposure value 16 is selected as the previous exposure value, the average brightness of the captured image is 5, the predicted exposure value is equal to 11.5, which is derived by 16 subtracted by Truricate($\log_2$ (100/5)). Therefore, the predicted exposure value 11.5 is not equivalent to the previous exposure value 16. From the lookup table as shown in FIG. 2, the exposure time, gain value and fF-number corresponding to the exposure value 11.5 are 1/250 sec, 141 and F2.8. The digital photographic device is then set up by these parameters to extract an image. The average brightness of the image is then calculated, such that the predicted exposure value can be obtained as 12. Again, the predicted exposure value 12 is not the same as the previous exposure value 11.5. The steps 108 to S114 are repeated. The exposure time, gain value and fF-number corresponding to the exposure value 12 can be obtained from the lookup table of exposure values as 1/250 sec, 100 and F4. The digital photographic device is then set up by these parameters to capture an image. The average brightness of the image is then calculated as 105, which results in a predicted exposure value as 12. The predicted exposure value is now equal to the previous exposure value. An automatic exposure is thus achieved, and the exposure value 12 is referred to as the appropriate exposure value.

According to the above, by setting up an easily modified lookup table of exposure values, the image captured by the optical sensor of the digital photographic device can be fast converged in a close-loop computation. Therefore, the present invention provides the exposure control for multiple variables, including exposure time, gain value and f-number to achieve the fast convergence of automatic exposure value.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A fast convergence method of appropriate exposure value, suitable for use in a digital photographic device, the method comprising:

(a) establishing a EV lookup table of exposure valuesby camera characteristics, wherein the exposure values-camera characteristics are a function of exposure time, gain value and fF-number of the digital photographic device;

(b) defining an automatic exposure convergence window, wherein a center of the automatic exposure convergence window is a target brightness;

(c) selecting a previous exposure value from the lookup table of exposure values as an initial setup value;

(d) extracting an image by an optical sensor of the digital photographic device, and segmenting the image into a plurality of sub-regions;

(e) obtaining an average brightness by multiplying an average brightness of each sub-region by a corresponding image weight, and dividing the product by an overall image weight of the image;

(f) determining a predicted exposure value according to the previous exposure value and a truncate function as a function of the target brightness and the average brightness; and (g) performing automatic exposure when the predicted exposure value is the same as the previous exposure value with the predicated exposure value as the appropriate exposure value.

2. The method according to claim 1, wherein when the predicted exposure value is not the same as the previous exposure value, repeating obtaining the exposure time, the gain value and the fF-number corresponding to the predicted exposure value from the lookup table and performing steps (d) to (g) until the predicted exposure value is the same as the previous value.

3. The method according to claim 1, where the lookup table of exposure values is adjustable.

4. The method according to claim 1, wherein a minimum interval of the exposure values in the lookup table is the resolution of exposure value.

5. The method according to claim 4, wherein the resolution of the exposure values is adjustable.

6. The method according to claim 4, wherein a dimension of the automatic exposure convergence window is proportional to the resolution of the exposure values.

7. The method according to claim 6, wherein the dimension of the automatic exposure convergence window is equivalent to the resolution of exposure value.

8. The method according to claim 7, wherein the automatic exposure convergence window ranges between the target brightness multiplied by two to the power of negative resolution of exposure value divided by two and the target brightness multiplied by two to the power of resolution of exposure value divided by two.

9. The method according to claim 1, wherein the predicated exposure value is equal to the previous exposure value subtracted by the truncate function.

10. The method according to claim 1, wherein the optical sensor comprises a charge coupled device.

11. The method according to claim 1, wherein the optical sensor comprises a complementary metal-oxide semiconductor device.

* * * * *